(12) United States Patent
Shaddle

(10) Patent No.: US 6,216,603 B1
(45) Date of Patent: Apr. 17, 2001

(54) VENTED HATCH COAMING

(75) Inventor: Richard B. Shaddle, Sandwich, IL (US)

(73) Assignee: Thrall Car Manufacturing Company, Chicago Heights, IL (US)

( * ) Notice: Subject to any disclaimer, the term of this patent is extended or adjusted under 35 U.S.C. 154(b) by 0 days.

(21) Appl. No.: 09/515,489

(22) Filed: Feb. 29, 2000

Related U.S. Application Data

(62) Division of application No. 09/215,089, filed on Dec. 18, 1998, now Pat. No. 6,053,113.

(51) Int. Cl.⁷ .................................................. B65D 51/00
(52) U.S. Cl. ..................................... 105/377.07; 220/371
(58) Field of Search .......................... 105/377.07, 377.08; 220/367.1, 371, 372, 745, 747, 746; 55/307, 308, 385.1, 385.4, 385.3

(56) References Cited

U.S. PATENT DOCUMENTS

| | | | |
|---|---|---|---|
| 3,921,432 | * 11/1975 | Rivers | 55/385.3 |
| 4,609,126 | 9/1986 | Janda | 220/374 |
| 4,819,830 | * 4/1989 | Schultz | 220/371 |
| 4,889,160 | * 12/1989 | Sheetz | 220/371 |
| 5,064,089 | * 11/1991 | Schutz | 220/372 |
| 5,813,352 | 9/1998 | Bramlett et al. | 105/377.07 |
| 5,960,980 | 11/1999 | Burke et al. | 220/325 |
| 5,968,215 | * 10/1999 | Webb | 55/385.3 |

* cited by examiner

Primary Examiner—Mark T. Le
(74) Attorney, Agent, or Firm—Fitch, Even, Tabin & Flannery

(57) ABSTRACT

A vented hatch coaming for a covered hopper car permits unloading without opening the hatch cover. The vented hatch includes an opening in the coaming for the passage of air. Preferably, a housing is positioned adjacent the ring opening to exclude contaminants and, where extraordinary sanitation is required, a filter element.

14 Claims, 7 Drawing Sheets

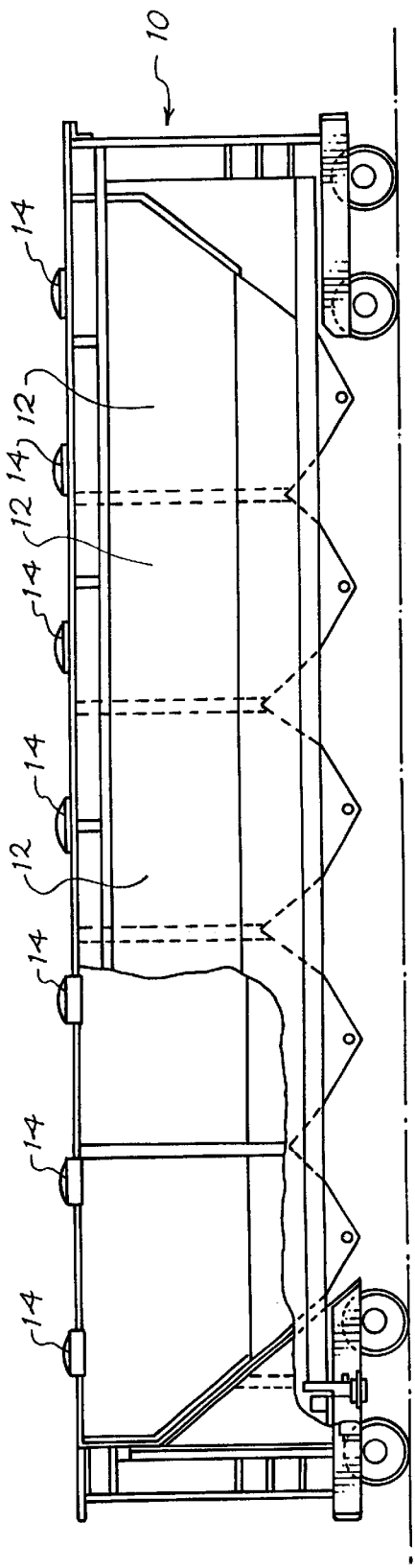
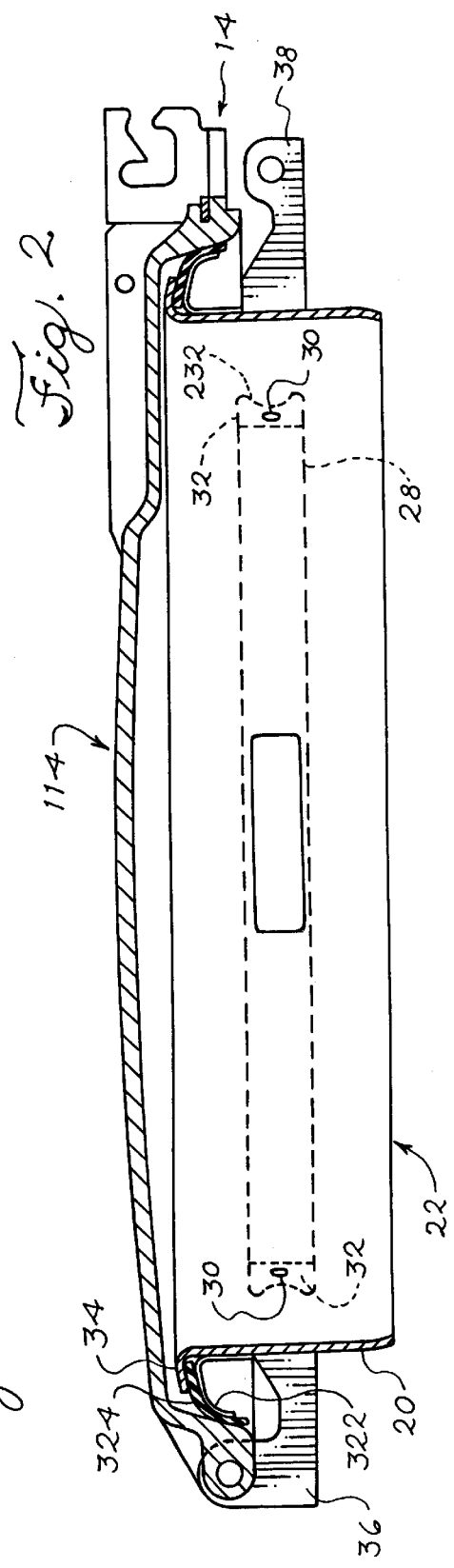

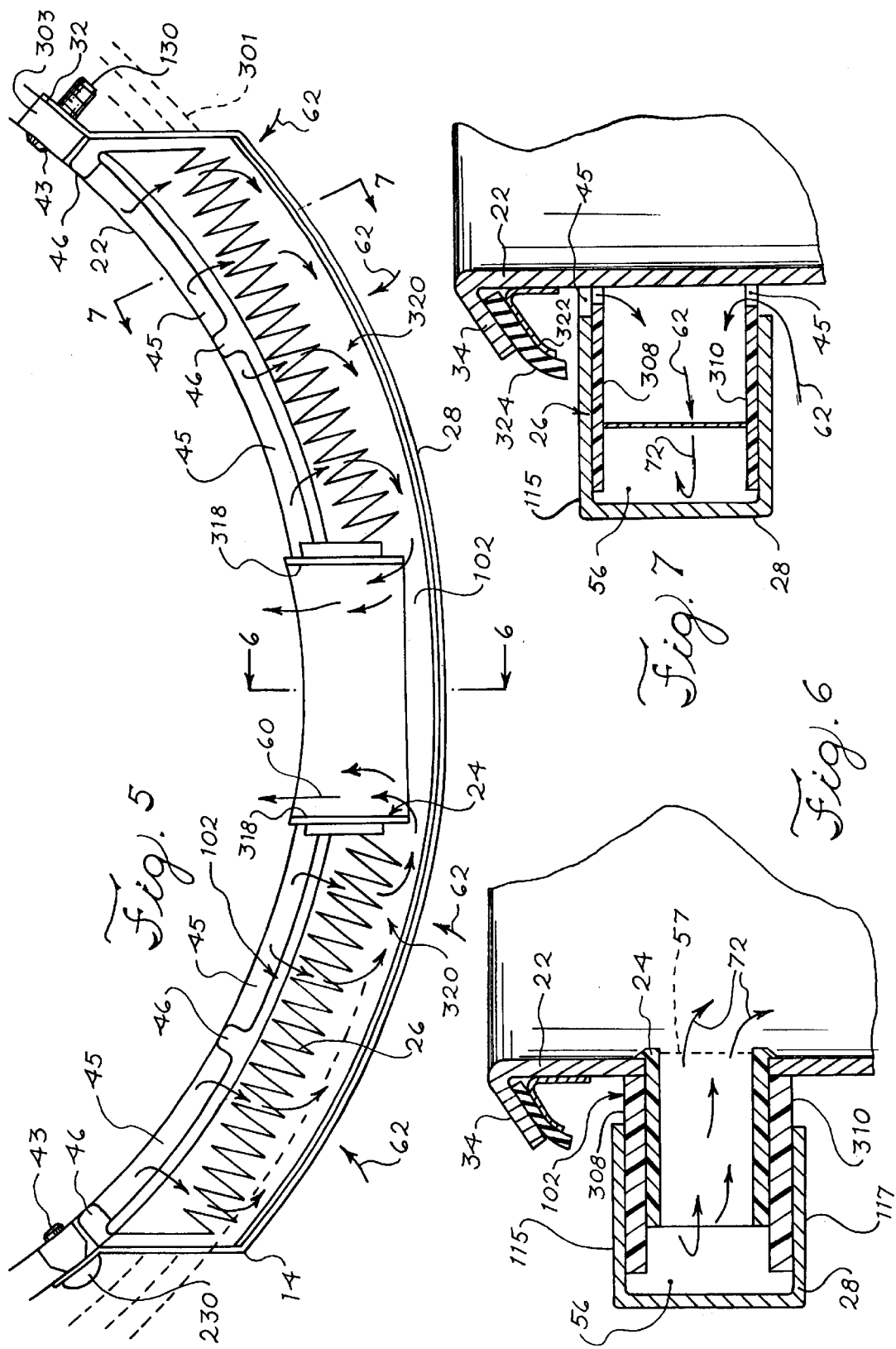

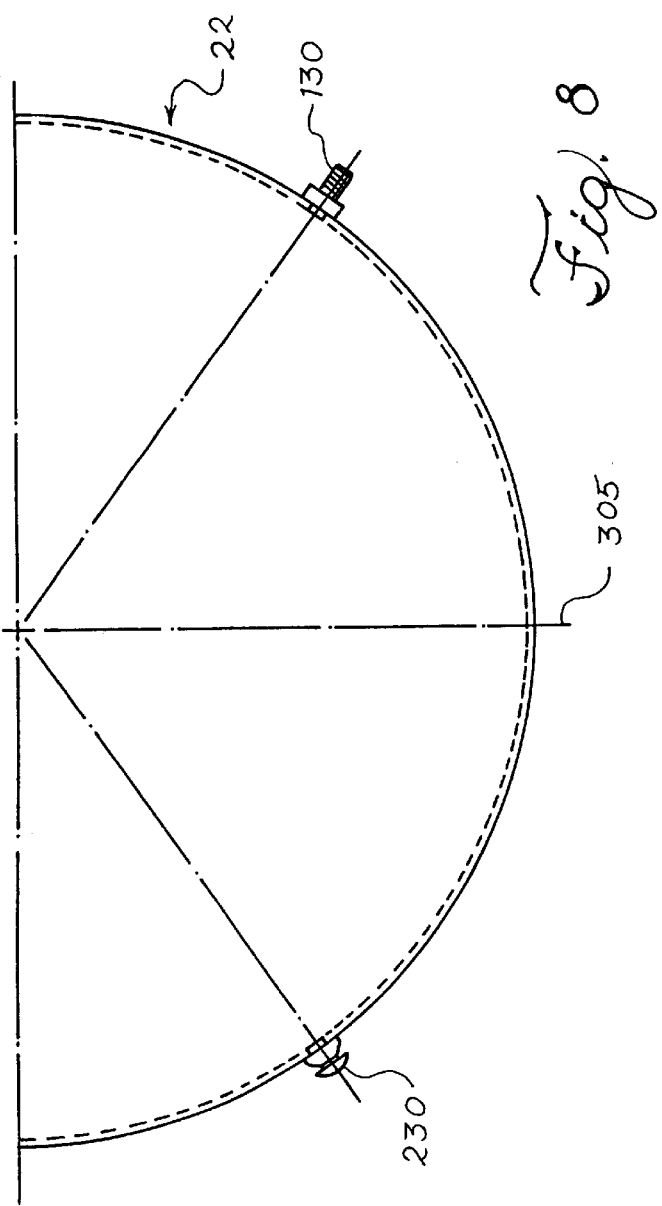
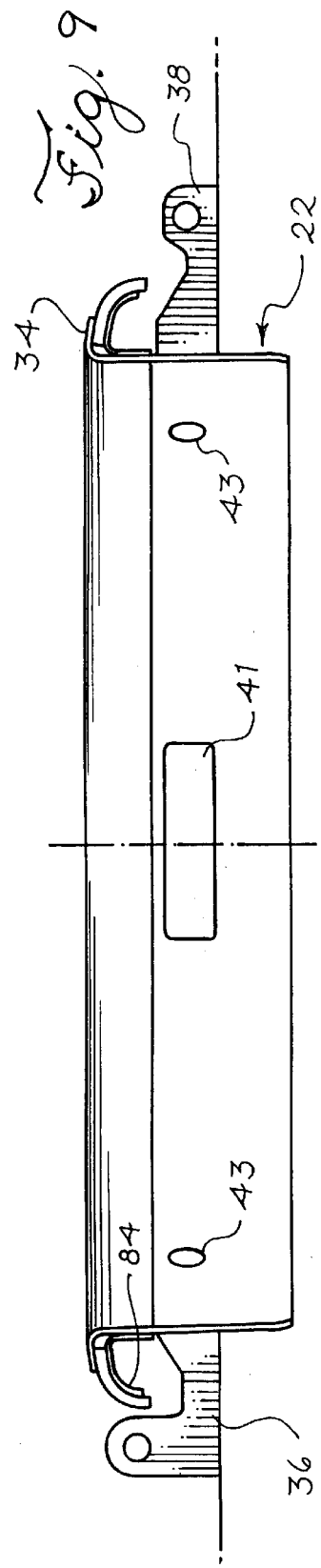

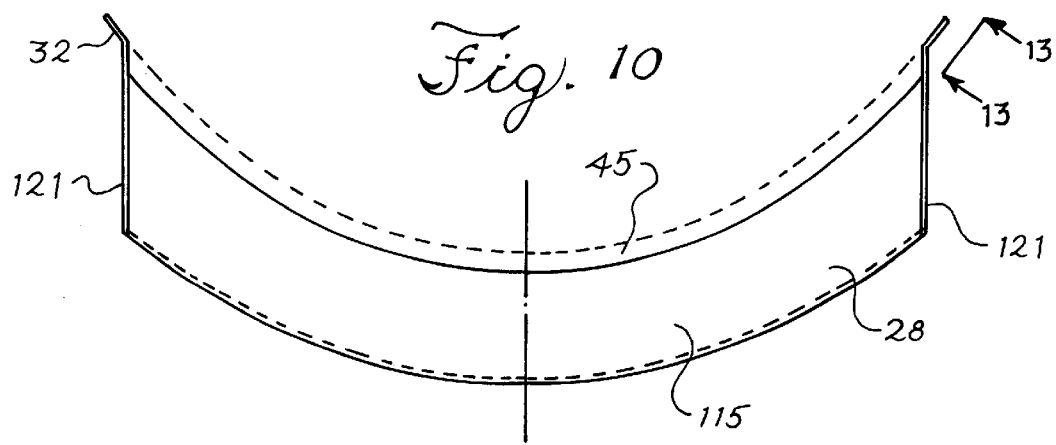
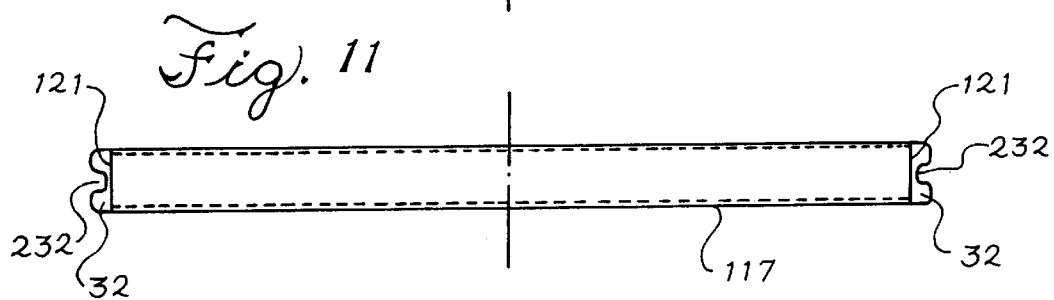
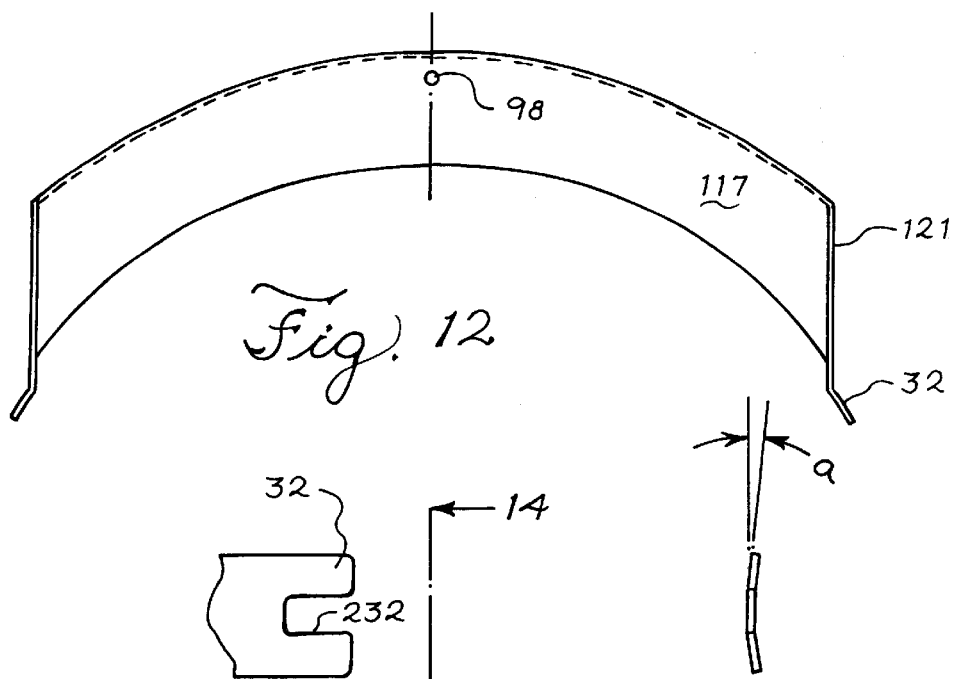

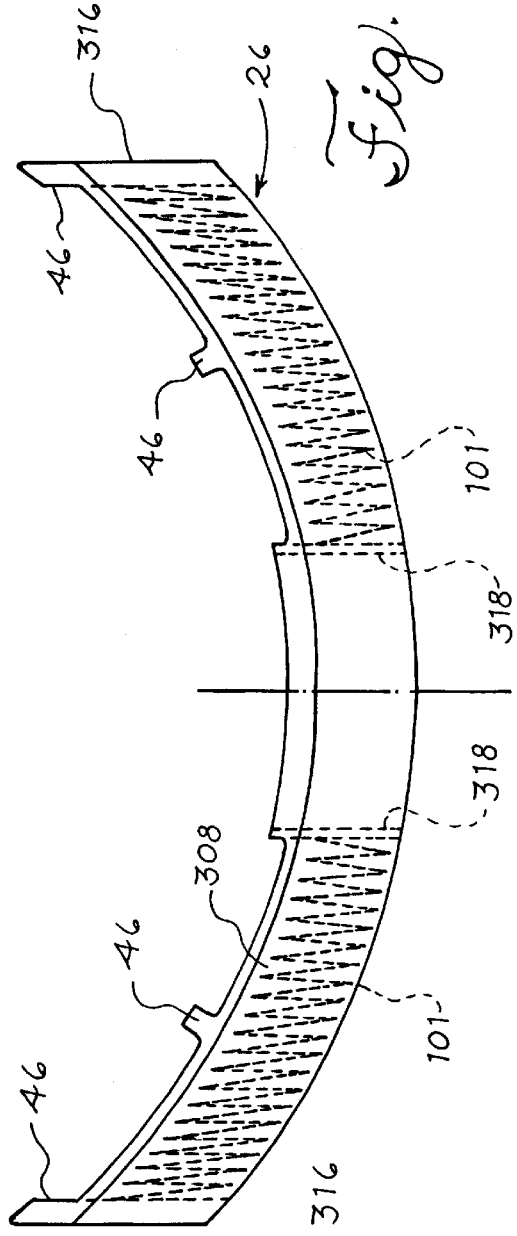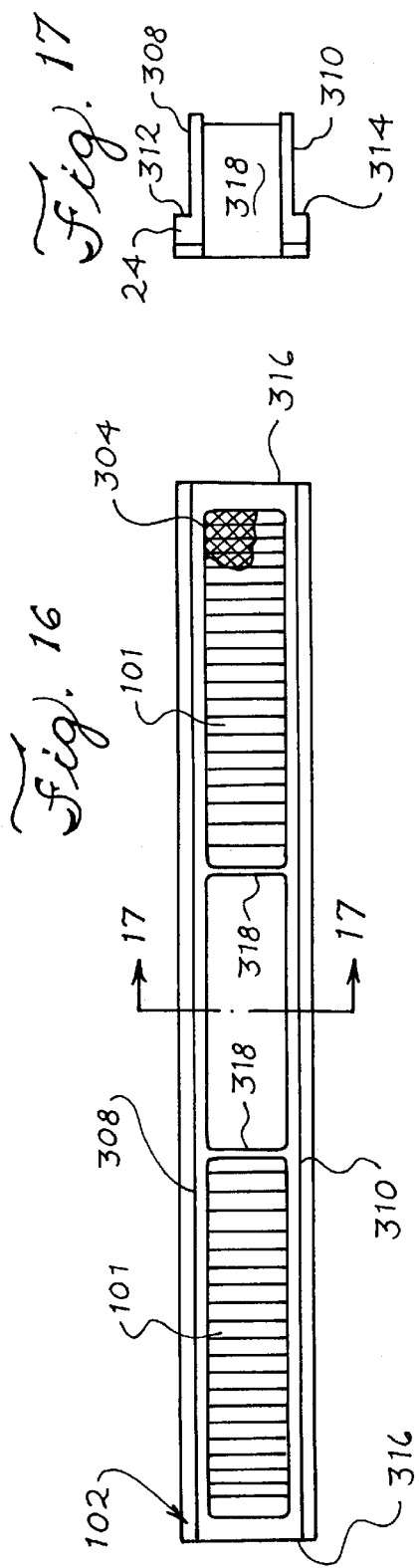

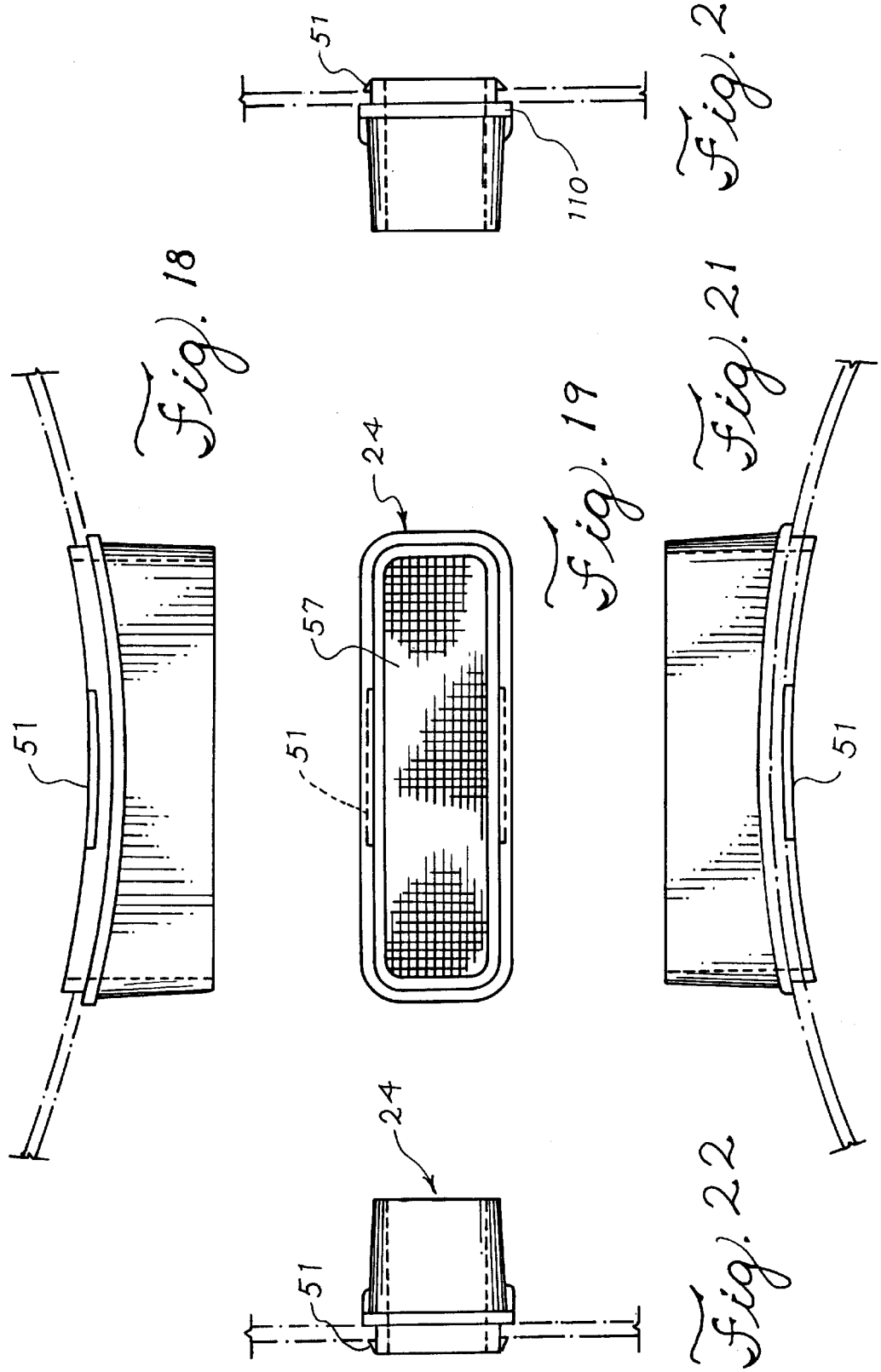

VENTED HATCH COAMING

This is a division of prior application Ser. No. 09/215,089, filed Dec. 18, 1998, now U.S. Pat. No. 6,053,113, which is hereby incorporated herein by reference in its entirety.

BACKGROUND OF THE INVENTION

This invention relates to railroad cars, and more particularly to protecting covered hopper cars from vacuum failure during unloading.

A covered hopper cars typically has partitions dividing the car into separate compartments, with each compartment having one or more openings for loading the car. The openings are typically defined by a coaming which extends upward on the top wall of the car, and may comprise, e.g., elongated rectangular openings or circular hatches. Where vacuum discharge gates are employed, materials are typically unloaded by applying a vacuum conveying line to a nozzle at the bottom of each compartment. The primary air flow for the vacuum line comes from outside the car, but the displacement of the lading creates a vacuum within the car, requiring venting of the car. If the partial vacuum is not relieved, it can reach a point where the car's body is damaged. Failure to vent the vacuum also reduces the efficiency of the unloading process. Where gravity or gravity pneumatic gates are employed, similar problems exist.

In the past, venting during unloading to prevent vacuum failure has commonly been achieved by opening at least one hatch cover on each compartment. However, this is somewhat inefficient in that it requires workers to climb to the top of the car to manually open each hatch. Venting may also be required after cleaning. If a compartment is cleaned with hot water or steam and the hatch is closed and sealed before the car interior has cooled to ambient temperature, subsequent cooling may result in a temperature differential sufficient to cause inward buckling of the walls of the car.

In recent years, two alternatives have been explored for venting of covered hopper cars: vents on the end walls of the cars and vented hatch covers. Each approach has problems.

Among the problems that must be addressed in providing a commercially viable vent in a hatch cover or end wall are removal of contaminants from the airflow during unloading, and physical access for maintenance. If filters or screens are used over the vents, sufficient physical access must be provided to enable railroad personnel to change or maintain them without undue difficulty. Consideration must also be given to the railcar's exposure to high winds, and high rates of airflow relative to the hatch covers during travel. Precipitation, dust, and other particles may be driven into the cars, contaminating the cargo, absent adequate filtration, particularly during conditions of high winds, rain, snow or other inclement weather.

Another problem that must be addressed by any venting solution for cars where high standards of purity apply, such as cars carrying plastic pellets, is preventing retention of any lading material. Retention of even a small quantity of a load in a vent, hatch cover or other component of a railcar may result in contamination of a subsequent load of a different material.

Vented hatch covers have not generally included filters capable of preventing fine particulates from contaminating the cargo. Accordingly, separate filters have generally been used to cover the openings underneath the vented hatch covers. These filters are similar in configuration to shower caps, with elastic being provided to hold them in place to cover the hatches after the covers have been raised. A significant disadvantage of these filters is that they must be removed when loading material into the car interior, and may have to be replaced with each load. It has been difficult to provide a commercially viable alternative due at least in part to the difficulties in providing a filter arrangement which can provide required volume flow rate during unloading without violating overhead clearance requirements, and which can be easily changed or serviced. Limited space is available adjacent the hatches, so bulky filter arrangements cannot be used. However, if the cross-section of the airflow path through a filter element is not large enough, the pressure drop across the filter element may be unacceptably high and cause inward buckling of the railcar sidewalls in response to vacuum build-up in the railcar interior.

Additional problems with vents in the end walls of covered hopper cars are that they provide airflow only to the end compartments, and due to difficult access, are very likely not to be maintained, thereby endangering the car body when the filter becomes clogged. Some structure may be required to support workers conducting maintenance. In the past, small breather holes of about 1 in. diameter have been provided on the ends of covered hopper cars carrying cement. These cars do not have seals between their interior compartments. A piece of angle or other protective structure is welded to the wall adjacent the hole to shield it from rainwater. Small breather holes have also been provided in hatch coamings, in conjunction with wire mesh to exclude insects. The breather holes permit sufficient airflow to compensate for changes in ambient temperature, but do not permit sufficient airflow to replace displaced cargo volume. Also, many cars have sealed interior compartments which cannot be vented by end wall vents.

There is a need in the industry for an improved commercially viable means to enable unloading of covered hopper cars which avoids the need to open the hatches during unloading, and which avoids contamination of the cargo both during vacuum discharge and at other times.

SUMMARY OF THE INVENTION

The invention provides a new approach to venting of covered hopper cars in which sufficient airflow is provided through an opening in the side of the coaming to prevent vacuum failure during unloading, without the need to open or vent any of the hatch covers. A housing or shield may extend outward from the side of the coaming and may contain one or more filter elements.

In a preferred embodiment, air intakes are provided in a sheltered location to reduce or eliminate intake of debris or precipitation. To this end, in the preferred embodiment, one or more openings or slots between the housing and the coaming may provide for the intake of air. Air flows through the slots into the housing, then through a filter element, then through the opening in the coaming and into the hopper car interior.

The filter elements preferably are removable so as to be replaceable. The housing is preferably attached to the outside of the coaming in a manner that facilitates removal and replacement of the filter element.

For cars intended to be used for transportation of loads in which control of contaminants does not require filtration, e.g., cement, the filter may be eliminated.

The opening in the coaming is sized to permit sufficient air flow into the car interior to replace the lading during unloading of the compartment, without an unduly high pressure drop under typical commercial unloading conditions. If greater air flow is required, one or more additional openings and housings may be provided in the coaming. The opening and housing are preferably located below the top edge of the coaming so as not to interfere with opening and closing of the cover. The cover need not be opened during unloading. Indeed, after loading, the cover can be sealed shut, only to be opened when the car is to be loaded with another cargo or cleaned. The vented coaming of the invention does not encroach into required overhead railroad clearances and is compact in size so as not to interfere with walking clearances for railroad workers on the covered hopper car.

Preferably, the vented coaming includes a throat element adapted to contact and seal against the opening in the coaming. The interior of the throat preferably defines an air passage through which air travels to the car interior. A screen may be positioned in the throat to provide protection against inflow of contaminants where a filter is not employed, and/or to prevent plastic pellets or other particulates from exiting the hatch. In cases where a lading such as plastic pellets having stringent requirements of purity is involved, the screen may prevent pellets from entering the throat or housing, which could result in contamination of future ladings by later displacement of such particulates.

Vented coamings in accordance with the invention may be installed as original equipment or, if desired, existing coamings may be modified to provide venting in accordance with the invention.

While the embodiments shown in the accompanying drawings include circular hatch rings, in other embodiments the invention may be employed with straight-sided rectangular trough hatches, or hatches of other shapes.

BRIEF DESCRIPTION OF THE DRAWINGS

FIG. 1 is an elevational view of a covered hopper car;

FIG. 2 a cross-section of a vented hatch ring according to a first embodiment of the invention;

FIG. 5 is a schematic sectional plan of a vented hatch ring in accordance with a second embodiment of the invention;

FIG. 6 is a cross-section along line 6—6 of FIG. 5;

FIG. 7 is a cross-section along line 7—7 of FIG. 5;

FIGS. 8 and 9 show connection features of the vented hatch ring of FIG. 5;

FIGS. 10–14 show a housing in accordance with a third embodiment of the invention;

FIGS. 15–17 show a filter assembly in accordance with the third embodiment of the invention; and FIGS. 18–22 show a throat in accordance with the third embodiment.

DESCRIPTION OF THE PREFERRED EMBODIMENTS

Figure 3:
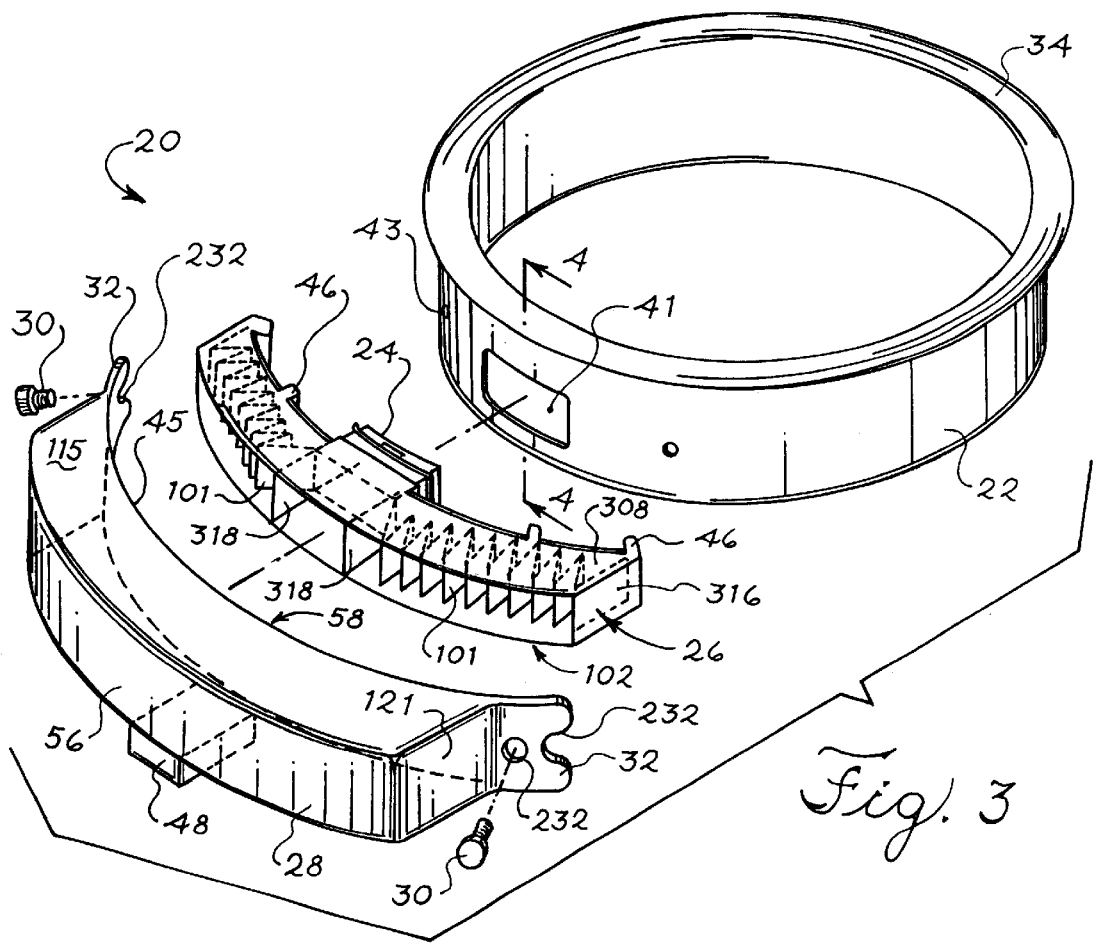
FIG. 3 is an exploded perspective view of the vented hatch ring of FIG. 2.
Figure 4:
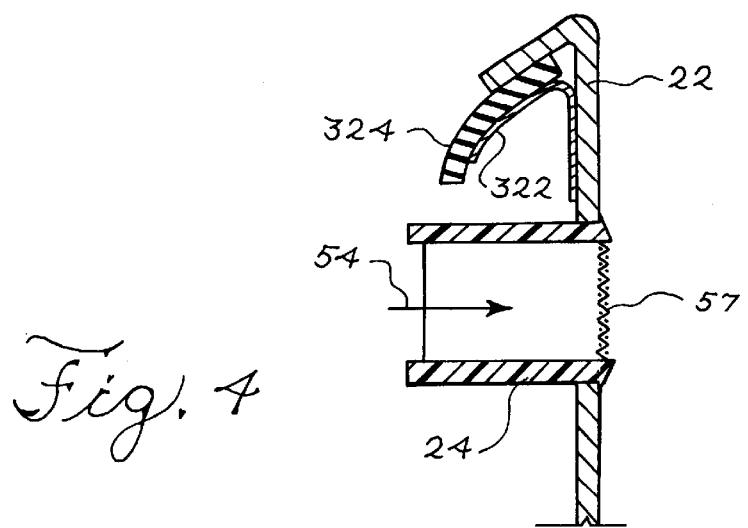
FIG. 4 is a cross-section of the ring, taken along line 4—4 of FIG. 3, showing the throat in its installed position.

The invention is preferably embodied in a covered hopper car, and in a vented hatch ring assembly for use on covered hopper cars. Three embodiments of the invention are shown in the drawings. Like reference numerals refer to similar components in the three embodiments.

Referring to FIG. 1, a covered hopper car 10 includes compartments 12 for the storage of particulate material. Each compartment includes a covered hatch assembly 14 for the loading of particulate cargo. Cargo is unloaded by applying a vacuum carrying line to an outlet located in the lower portion of each compartment 12.

Referring to FIGS. 2 and 3, covered hatch assembly 14 includes hatch cover 114 and a circular vented hatch ring assembly 20. In other embodiments, the hatch may be a trough hatch rather than a circular hatch as shown.

In the illustrated embodiment, vented hatch ring assembly 20 includes a ring 22 which is generally circular in cross-section and sized to fit the hatch. The height of ring 22 is also chosen so that the overall height of the hatch cover assembly is within overhead clearance requirements. The upper edge of ring 22 is shown with a flange portion 34 which cooperates with a gasket retainer 322 to retain a gasket 324 for supporting hatch cover 114 in the closed position. In other embodiments, other seal arrangements may be employed. For example, a seal or gasket may be mounted on underside of the cover, rather than the coaming.

In the illustrated embodiment, brackets 36 and 38, mounted to ring 22, also support hatch cover 114. Hatch cover 114 is opened by rotating about bracket 36. Bracket 38 includes a locking arm assembly for securing hatch cover 114 closed. Where the car is intended for use with high-purity ladings such as plastic pellets, ring 22 is made preferably of stainless steel, with all interior surfaces polished smooth to prevent retention of particulate matter.

Ring 22 includes an opening 41 in its side which enables the passage of airflow into the covered hopper car 10. Opening 41 is preferably rectangular in shape with rounded corners to facilitate the flow of stress around the opening. Although only one opening 41 is shown in the illustrated embodiment, additional openings can be included to increase airflow in other embodiments.

Attached to ring 22 is housing 28. Housing 28 in the case of circular hatches is generally arcuate in shape having an upper wall 115, lower wall 117, an outer wall 302 and two side walls 121. Side walls 121 include flanges 32 having one or more holes or open-ended slots 232 therein. In other embodiments, e.g., in embodiments involving trough hatches, housings of other shapes, e.g., trapezoidal or rectangular, rather than curved, may be employed. In the embodiment of FIGS. 1–3, housing 28 is secured to ring 22 at each flange 32 by a fastener 30. A drain hole may be provided in the bottom surface 117 to permit drainage of moisture.

In each of the preferred embodiments, the inner and outer edges of the top and bottom walls of housing 28 are defined by two radial arcs concentric with the ring 22, although other shapes may be used in other embodiments. The flanges 32 have slots or openings 232 to accommodate the fasteners connecting the housing assembly to the hatch ring. The inner edges of the upper and lower walls 115 and 117 are spaced from the ring 22 to provide slots 45 for air to flow into the housing. Housing 28 is preferably formed of stainless steel of a grade sufficient to withstand the weight of rail personnel who might step on it.

In the embodiment of FIGS. 5–9, fasteners 130 and 230 are attached to the ring 22 by engagement with holes 43. Fastener 130 is a threaded stud which may by held in place by threaded engagement with hole 43, or by welding or other means. Fastener 230 is a notched stud which may be similarly secured to the ring. Fastener 130 includes spacer 303 between ring 22 and flange 32. When housing 28 is attached to ring 22, portions of the fasteners extend through the openings in flanges 32. A wing nut (not shown) or other fastener may be used in combination with spacer 303 to cooperate with stud 130 to removably secure the housing in place. To facilitate removal of the housing, fastener 230 enables the housing to pivot about a vertical axis through fastener 230. The housing can be removed simply by removing the wing nut or other fastener from stud 130, pivoting the housing about fastener 230, and disengaging the housing from fastener 230. In other embodiments, threaded studs may be provided at both ends of the housing in conjunction with suitable fasteners to removably retain the housing in place.

In the embodiment of FIGS. 10–21, the upper and lower legs of the flanges are inclined at an angle "a", which may be, e.g., about 5°, as shown in FIG. 14.

In the illustrated embodiment, intake of contaminants into the interior of the car is reduced or eliminated by providing an airflow path in which air flows under the hatch cover and/or the housing to reach intake slots 45, then reverses direction twice before flowing through throat 24. In the preferred embodiment, when housing 28 is attached to ring 22, openings or slots 45 are formed between the inner edge of upper surface 115 and the exterior of ring 22 and also between the inner edge of lower surface 117 and the exterior of ring 22. The openings 45 run along substantially the entire inner side of housing 28 along both the upper surface 115 and the lower surface 117 as shown in FIGS. 6 and 7, interrupted only by the throat 24 and housing extensions 46. The locations and sizes of the slots 45 are chosen to permit sufficient airflow into the compartment 12 during unloading. Locating slots 45 adjacent the ring 22 also provides protection from weather. Hatch cover 114 provides protection to slots 45 both during unloading and when the hopper car is traveling. The housing itself provides additional protection, particularly for the lower slots.

As shown in FIG. 5, housing 28 preferably does not extend far beyond the "footprint" of hatch cover 114. This avoids clearance problems. Also, by limiting the radial extent of the housing beyond the hatch cover, more space is provided to workers. This also provides for a compact design. The radial extent of the outer edge of the cover is indicated at 301 in FIG. 5.

Housing 28 is preferably made of stainless steel. The housing is preferably self-supporting when secured by two fasteners 30 at its opposite ends. However, if necessary, a support 48, shown in FIG. 3, may be located substantially at the center of the bottom of the housing 28. In other embodiments, no support may be provided, or, if necessary, a plurality of supports may be provided.

Housing 28 supports filter assembly 26. Unfiltered air, indicated at 62 in FIGS. 5, 6 and 7, flows radially inward toward ring 22 above and below the housing 28, then passes through slots 45 and reverses direction to flow radially outward through filter 26. Filtered air 72 then reverses direction again to flow inward through throat 24, screen 57, and ring opening 41 into the compartment 12 as shown in FIG. 6.

In the preferred embodiments, filter 26 includes two pleated segments 101 supported within a frame 102. Frame 102 is preferably made of a deformable plastic material, and includes upper and lower walls 308 and 310. Along the inner edge of upper wall 308 is an upwardly-extending flange 312 which engages and seals against the inner edge of the top wall 115 of the housing. A flange 314 on the lower wall 310 similarly engages and seals against the bottom wall 117 of the housing. The upper and lower walls 308 and 310 are joined by vertical end walls 316 and interior vertical walls 318. Inward extensions 46 from the top and bottom walls, which may be connected by vertical ribs, define openings 45 therebetween for inflow of air.

The frame 102 in the illustrated embodiment forces incoming air to flow in the desired path through the filter while reversing direction twice, to aid in removing dust, rainwater, and other airborne impurities from inflowing air. Removal of precipitation may be further assisted by provision of a plenum 320 on each side of the frame 102.

The pleated segments 101 may be formed of, e.g., a non-woven polyester, dense paper, a stainless steel mesh, or a polymeric foam material with sufficient porosity to permit adequate airflow while removing contaminants. A stainless steel wire cloth 304, shown fragmentarily in FIG. 16, may be provided on both sides of the filter elements 101. In some embodiments, the pleated segments 101 may be required to permit airflow of 100 cubic feet per minute through the vented hatch ring assembly during unloading with conventional vacuum equipment without reducing pressure in the associated compartment by more than 0.5 p.s.i., with the filter removing at least 90% of particles greater than $20\mu$. The apparatus may be designed, for example, to sustain a vacuum of 0.25 p.s.i. during unloading. In other embodiments, the airflow, vacuum and filtration requirements may differ. For example, cars in soda ash service may require much higher airflow rates, but without such stringent filtration requirements.

While prevention of vacuum damage during unloading is a primary concern, the restrictive effect of the vent may in some cases improve the unloading process. By restricting the amount of air allowed through the hatch, the vent may help to prevent short-circuiting of airflow in pneumatic-unloading cars. A pneumatic gate typically includes a tube extending beneath a valve. A vacuum line is connected to one end, on one side of the gate, and air flows in the opposite end, on the other side of the gate. In some valves, only one side is open at any time. However, in other valves, both sides may be open at the same time. Short-circuiting can occur with certain types of valves when a portion of the lading on the side of the gate nearest the vacuum line is fully discharged while another part of the lading remains over the valve on the other side of the gate. If the valve is open on both sides, a high rate of airflow into the valve on the empty side may result in a reduction of airflow into the open end of the tube opposite the vacuum line. This short-circuiting of the airflow may result in delays in discharge of the remaining lading, and may even result in clogging of the tube. The invention may prevent such short-circuiting in embodiments where the vent restricts airflow sufficiently to maintain a high rate of airflow into the open end of the tube, regardless of whether the lading on one side of the gate has been fully discharged while another portion remains to be unloaded over a valve which is open on both sides.

In the illustrated embodiments, throat 24 extends through opening 41 and is configured to avoid retention of pellets. Preferably, throat 24 is sized to contact and seal against opening 41 without projecting into the interior of the hatch to an extent that would interfere with loading.

In the embodiment illustrated in FIGS. 18–21, throat 24 is a separate piece, not part of filter assembly 26. Filter assembly 26 fits about throat 24. Throat 24 may be formed of a plastic material such as nylon, a thermoplastic rubber, or another material and may include a stainless steel mesh screen 57 molded or epoxied in place. Throat 24 is generally rectangular in shape with a hollow center for the passage of air flow. Snap connectors or retainers 51 hold throat 24 in place within opening 41 of ring 22 as shown in FIG. 20.

The vented hatch ring assembly 20 may be installed during manufacture of the rail car. The ring 22 may be welded to the roof or top wall of the railcar. After initial installation, replacement of the filter element is readily accomplished by removing a wing nut or other suitable device from stud 130, removing the housing, removing the old filter element, positioning a new filter element in engagement with the throat, then replacing the housing and wing nut.

While particular embodiments of the invention have been illustrated and described, it will be appreciated that numerous changes and modifications will occur to those skilled in the art. For example, while the illustrated embodiments show the center 305 of opening 41 at a location on the hatch ring which is 90° away from brackets 36 and 38, the opening may be placed at other locations if desired. Also, in some embodiments, other frame configurations and filter arrangements may be employed. For example, an annular filter surrounding opening 41 may be employed. Furthermore, the size, shape, configuration and flow capacity of the apparatus described above may be varied in other ways, and materials different from those mentioned above may be used for its manufacture. It is intended in the appended claims to cover all those changes and modifications which fall within the true spirit and scope of the present invention.

What is claimed is:

1. In a covered hopper car, a filter element for use in a vented hatch assembly including a coaming, one or more covers, a coaming opening in the periphery of the coaming for enabling the passage of air into the interior of the hopper car, and a housing having at least one housing opening, positioned external to the coaming opening and adjacent thereto, the filter element comprising:

first and second pleated sections; and a throat element having an opening for contacting and sealing against the coaming at the coaming opening, disposed between the first and second pleated sections, the interior of the throat element defining an air passage between the coaming opening and the first and second pleated sections.

2. The filter element of claim 1 further comprising a screen disposed across the throat opening.

3. The filter element of claim 1 wherein the first and second pleated sections include ribs along inner edges.

4. The filter element of claim 1 wherein the first and second pleated sections comprise stainless steel mesh.

5. The filter element of claim 1 wherein the first and second pleated sections comprise polyester mesh.

6. The filter element of claim 1 wherein the first and second pleated sections comprise paper.

7. The filter element of claim 1 wherein the first and second pleated sections are generally arcuate in shape.

8. A removable vented hatch coaming filter element configured to function as part of a vented hatch coaming assembly in a covered hopper car including a vented hatch coaming having an air intake opening formed therethrough, said filter element permitting sufficient inflow of air into the air intake opening to permit unloading of the car with conventional vacuum unloading equipment without increasing vacuum beyond acceptable levels during unloading, said removable filter element comprising a frame defining a throat, and at least one filter member supported by said frame adjacent said throat, said filter element being configured to cooperate with a housing extending about an outer portion of said filter element to define a space for airflow between said filter element and said throat, wherein said filter element is configured to be attached along a side of the vented hatch coaming adjacent the air intake opening, and said throat is configured to enable said throat to seal against the vented hatch coaming with the interior of said throat communicating with the air intake opening in the vented hatch coaming.

9. A filter element in accordance with claim 8 wherein said at least one filter member comprises a pair of pleated filter members supported in said frame on either side of said throat.

10. A filter element in accordance with claim 9 wherein said frame includes extensions extending radially inward and having gaps therebetween to define air intake slots.

11. A filter element in accordance with claim 8 wherein said housing and said at least one filter member are arranged to enable airflow outward through said at least one filter member, then inward through said throat.

12. A filter element in accordance with claim 8 wherein said filter element permits airflow of about 100 cfm without a pressure drop of more than 0.5 p.s.i., with at least a 90% rate of removal of particles greater than 20μ.

13. A filter element in accordance with claim 8 further comprising retainers on said throat.

14. A filter element in accordance with claim 8 further comprising snap fasteners on said throat.

* * * * *